(12) United States Patent
Zhang et al.

(10) Patent No.: US 11,641,679 B2
(45) Date of Patent: May 2, 2023

(54) SIDELINK DATA INDICATION METHOD AND TERMINAL EQUIPMENT

(71) Applicant: VIVO MOBILE COMMUNICATION CO., LTD., Guangdong (CN)

(72) Inventors: Yanxia Zhang, Guangdong (CN); Xiaodong Yang, Guangdong (CN); Qian Zheng, Guangdong (CN); Jingzhi Ma, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 23 days.

(21) Appl. No.: 16/969,592

(22) PCT Filed: Jan. 30, 2019

(86) PCT No.: PCT/CN2019/073854
§ 371 (c)(1),
(2) Date: Aug. 13, 2020

(87) PCT Pub. No.: WO2019/157956
PCT Pub. Date: Aug. 22, 2019

(65) Prior Publication Data
US 2021/0014913 A1    Jan. 14, 2021

(30) Foreign Application Priority Data
Feb. 13, 2018    (CN) .......................... 201810150670.X

(51) Int. Cl.
*H04W 76/11* (2018.01)
*H04W 72/04* (2009.01)
*H04W 72/0453* (2023.01)

(52) U.S. Cl.
CPC ........ *H04W 76/11* (2018.02); *H04W 72/0453* (2013.01)

(58) Field of Classification Search
None
See application file for complete search history.

(56) References Cited

U.S. PATENT DOCUMENTS

| | | | |
|---|---|---|---|
| 2015/0085791 A1* | 3/2015 | Baghel | H04W 76/14 370/329 |
| 2016/0219132 A1 | 7/2016 | Lee et al. | |

(Continued)

FOREIGN PATENT DOCUMENTS

| | | |
|---|---|---|
| CN | 104954976 A | 9/2015 |
| CN | 105163346 A | 12/2015 |

(Continued)

OTHER PUBLICATIONS

Extended European Search Report dated Mar. 19, 2021 issued in PCT/CN2019/073854.

(Continued)

*Primary Examiner* — Saba Tsegaye
(74) *Attorney, Agent, or Firm* — Brooks Kushman P.C.

(57) ABSTRACT

The present application discloses a sidelink data indication method and a terminal equipment. The method includes: determining indication information, the indication information including at least one of a first identifier or a second identifier, wherein the first identifier is used to identify a first logical channel, the second identifier is used to identify a second logical channel, the first logical channel is used to carry original sidelink data, the second logical channel is used to carry duplicated sidelink data, the duplicated sidelink data is obtained by duplicating the original sidelink data; and sending the indication information.

18 Claims, 3 Drawing Sheets determining indication information, the indication information including at least one of a first identifier or a second identifier, wherein the first identifier is used to identify a first logical channel, the second identifier is used to identify a second logical channel, the first logical channel is used to carry original sidelink data, the second logical channel is used to carry duplicated sidelink data, the duplicated sidelink data is obtained by duplicating the original sidelink data. — S101 sending the indication information — S102

(56) References Cited

U.S. PATENT DOCUMENTS

| | | | |
|---|---|---|---|
| 2017/0374674 A1 | 12/2017 | Lee et al. | |
| 2018/0035276 A1* | 2/2018 | Kang | H04W 48/08 |
| 2019/0007930 A1 | 1/2019 | Zhao et al. | |
| 2019/0215685 A1* | 7/2019 | Wang | H04W 8/22 |
| 2019/0239112 A1* | 8/2019 | Rao | H04W 4/70 |
| 2019/0253927 A1* | 8/2019 | Mok | H04W 28/0226 |
| 2020/0374744 A1* | 11/2020 | Liu | H04W 28/0278 |

FOREIGN PATENT DOCUMENTS

| | | |
|---|---|---|
| CN | 106412794 A | 2/2017 |
| CN | 107211017 A | 9/2017 |
| CN | 107347215 A | 11/2017 |

OTHER PUBLICATIONS

3GPP TSG-RAN WG2 Meeting #99bis; R2-1711013; Prague, Czech, Oct. 9-13, 2017, "Discussion on Data Duplication for PC5 CA"; 5 pages.
3GPP TSG-RAN WG2 #99bis; Tdoc R2-1710502; Prague, Czech Republic, Oct. 9-13, 2017; "Packet duplication in LTE"; 2 pages.
3GPP TSG-RAN WG2 Meeting #100; R2-1713841 Resubmission (R2-I TI ABU); Reno, USA, Nov. 27-Dec. 1, 2017; "Packet Duplication for the Sidelink Carrier Aggregation"; 3 pages.
First Office Action dated Apr. 21, 2020 issued in Chinese Application No. 201810150670.X.
3GPP TSG-RAN WG2 Meeting #99bis, R2-1710083, Prague, Czech Republic, Oct. 9-13, 2017, "Consideration on resource allocation for PC5 CA", 2 pages.
3GPP TSG-RAN WG2#101, R2-1801983, Athens, Greece, Feb. 26-Mar. 2, 2018, "Consideration on Packet Duplication over Sidelink", 3 pages.

\* cited by examiner

SIDELINK DATA INDICATION METHOD AND TERMINAL EQUIPMENT

CROSS-REFERENCE TO RELATED APPLICATION

This application is the U.S. national phase of PCT Application No. PCT/CN2019/073854 filed on Jan. 30, 2019, which claims priority to Chinese Patent Application No. 201810150670.X filed on Feb. 13, 2018, the disclosures of which are incorporated in their entirety by reference herein.

TECHNICAL FIELD

The present disclosure relates to the field of communication/terminal, and in particular to a sidelink data indication method and a terminal equipment.

BACKGROUND

In the sidelink technology, the transmitter device can perform data duplication on the original sidelink data at the Packet Data Convergence Protocol (PDCP) layer, and obtain the duplicated sidelink data. Then, the transmitter device can provide the original sidelink data and the duplicated sidelink data to two different Radio Link Control (RLC) entities, respectively, where the different RLC entities correspond to different logical channels. Therefore, the original sidelink data and the duplicated sidelink data can reach the receiver device from the transmitter device via two different logical channels, and the receiver device performs subsequent processing.

It can be seen from the above that the original sidelink data and the duplicated sidelink data can be correspondingly transmitted via two different logical channels. From this, it can be seen that the transmitter device and the receiver device need to have a consistent recognition to the original sidelink data and the duplicated sidelink data, in order that the original sidelink data and the duplicated sidelink data can be received based on the two logical channels. Generally, the two logical channels are determined by the transmitter device. Thus, in the related art, the transmitter device can recognize the two logical channels, but the receiver device cannot recognize the two different logical channels.

SUMMARY

An object of the embodiments of the present disclosure is to provide a sidelink data indication method and a terminal equipment so as to solve the problem that the receiver device cannot recognize the logical channels for carrying the original sidelink data and the duplicated sidelink data.

In a first aspect, an embodiment of the present disclosure provides a sidelink data indication method applied to a transmitter device, and the method includes:
determining indication information, the indication information including at least one of a first identifier or a second identifier, wherein the first identifier is used to identify a first logical channel, the second identifier is used to identify a second logical channel, the first logical channel is used to carry original sidelink data, the second logical channel is used to carry duplicated sidelink data, the duplicated sidelink data is obtained by duplicating the original sidelink data; and
sending the indication information.

In a second aspect, an embodiment of the present disclosure provides a sidelink data indication method applied to a receiver device, and the method includes:
receiving indication information, the indication information including at least one of a first identifier or a second identifier, wherein the first identifier is used to identify a first logical channel, the second identifier is used to identify a second logical channel, the first logical channel is used to carry original sidelink data, the second logical channel is used to carry duplicated sidelink data, the duplicated sidelink data is obtained by duplicating the original sidelink data; and
determining the first logical channel and the second logical channel based on at least one of the first identifier or the second identifier in the indication information.

In a third aspect, an embodiment of the present disclosure further provides a terminal equipment, and the terminal equipment includes:
a determination module for determining indication information, the indication information including at least one of a first identifier or a second identifier, wherein the first identifier is used to identify a first logical channel, the second identifier is used to identify a second logical channel, the first logical channel is used to carry original sidelink data, the second logical channel is used to carry duplicated sidelink data, the duplicated sidelink data is obtained by duplicating the original sidelink data; and
a sending module for sending the indication information.

In a fourth aspect, an embodiment of the present disclosure further provides a terminal equipment, and the terminal equipment includes:
a transceiver module for receiving indication information, the indication information including at least one of a first identifier or a second identifier, wherein the first identifier is used to identify a first logical channel, the second identifier is used to identify a second logical channel, the first logical channel is used to carry original sidelink data, the second logical channel is used to carry duplicated sidelink data, the duplicated sidelink data is obtained by duplicating the original sidelink data; and
a determination module for determining the first logical channel and the second logical channel based on at least one of the first identifier or the second identifier in the indication information.

In a fifth aspect, provided is a terminal equipment including a storage, a processor, and a computer program stored on the storage and capable of running on the processor, the computer program implementing, when executed by the processor, the steps of the method according to the first aspect.

In a sixth aspect, provided is a terminal equipment including a storage, a processor, and a computer program stored on the storage and capable of running on the processor, the computer program implementing, when executed by the processor, the steps of the method according to the second aspect.

In a seventh aspect, provided is a computer readable storage medium having a computer program stored thereon, the computer program implementing, when executed by a processor, the steps of the method according to the first or the second aspect.

In the embodiments of the present disclosure, the transmitter device may determine indication information, the indication information may include therein at least one of a first identifier or a second identifier, wherein the first identifier is used to identify a first logical channel, the second identifier is used to identify a second logical channel, the first logical channel may be used to carry original sidelink data, the second logical channel may be used to carry duplicated sidelink data, the duplicated sidelink data is obtained by duplicating the original sidelink data; after determining the indication information, the transmitter device may send the indication information. It can be seen from the embodiments of the present disclosure that the transmitter device may indicate at least one of the first logical channel for carrying the original sidelink data or the second logical channel for carrying the duplicated sidelink data by sending indication information, so that the receiver device receiving the indication information can recognize the logical channel carrying the corresponding sidelink date.

BRIEF DESCRIPTION OF THE DRAWINGS

The drawings here being a part of the specification are to provide a further understanding of the present disclosure. The illustrative embodiments of the present disclosure and their descriptions are intended to explain the present disclosure and do not constitute an undue limitation of the present disclosure. In the drawings.

DETAILED DESCRIPTION

The technical solutions in the embodiments of the present disclosure will be described below clearly and thoroughly in conjunction with the drawings in the embodiments of the present disclosure. Obviously, the described embodiments are some of the embodiments of the present disclosure, but not all the embodiments. Based on the embodiments in the present disclosure, all other embodiments obtained by those of ordinary skill in the art without making creative efforts fall within the protection scope of the present disclosure.

The technical solutions of the present disclosure may be applied to a user equipment (UE), which can also be called a mobile terminal, a mobile user equipment, etc. The user equipment may be a mobile terminal, such as a mobile phone (or called a "cellular" phone), a computer with a mobile terminal, for example, a portable, pocket-sized, handheld, computer built-in or in-vehicle mobile device.

The technical solutions provided by the embodiments of the present disclosure will be described in detail below in conjunction with the drawings.

Figure 1:
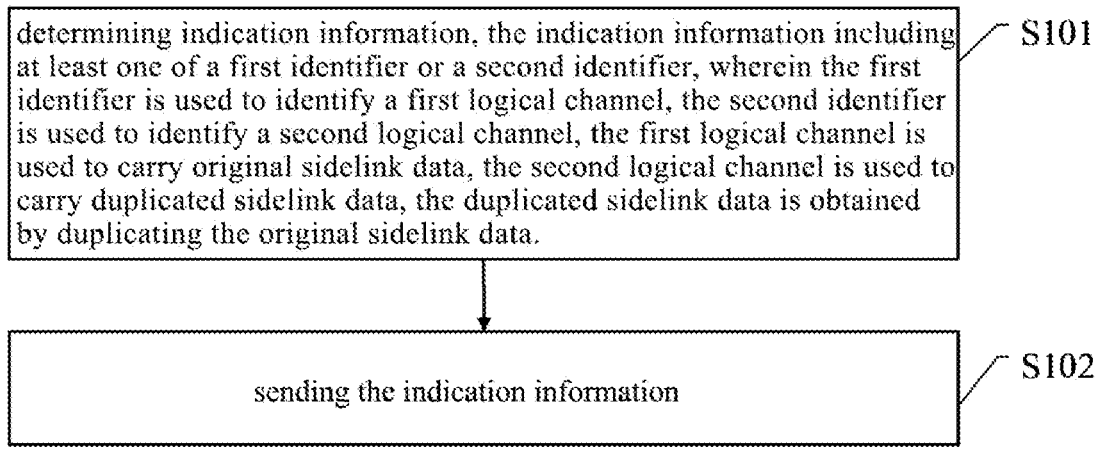
FIG. 1 is a flowchart of a sidelink data indication method in an embodiment of the present disclosure.

FIG. 1 is a flowchart of a sidelink data indication method in an embodiment of the present disclosure. In this embodiment, the sidelink data indication method is applied to a transmitter device. The method shown in FIG. 1 may include:

Step 101: determining indication information, the indication information including at least one of a first identifier or a second identifier, wherein the first identifier is used to identify a first logical channel, the second identifier is used to identify a second logical channel, the first logical channel is used to carry original sidelink data, the second logical channel is used to carry duplicated sidelink data, the duplicated sidelink data is obtained by duplicating the original sidelink data.

In the embodiment of the present disclosure, the transmitter device may transmit the original sidelink data and the duplicated sidelink data, the duplicated sidelink data is obtained by duplicating the original sidelink data. During transmission, the transmitter device may determine the first logical channel for carrying the original sidelink data and the second logical channel for carrying the duplicated sidelink data.

In the embodiment of the present disclosure, the transmitter device may determine the first and second logical channels after or before determining the original sidelink data and the duplicated sidelink data; of course, it may also determine the first and second logical channels while determining the original sidelink data and the duplicated sidelink data, which is not limited in the embodiment of the present disclosure.

After determining the first and second logical channels, the transmitter device may determine a corresponding identifier of at least one of the two logical channels. Specifically, the transmitter device may determine the identifier of the first logical channel as a first identifier, or determine the identifier of the second logical channel as a second identifier; of course, the transmitter device may also determine both the first identifier of the first logical channel and the second identifier of the second logical channel, which is not limited in the embodiment of the present disclosure.

After determining the corresponding identifier of at least one of the above two logical channels, the transmitter device may determine the indication information based on the determined identifier, the indication information may include therein at least one of the above first or second identifier.

Step 102: sending the indication information.

In the embodiment of the present disclosure, the transmitter device may determine the indication information, the indication information may include therein at least one of the first identifier for identifying the first logical channel or the second identifier for identifying the second logical channel, wherein the first logical channel may be used to carry the original sidelink data, the second logical channel may be used to carry the duplicated sidelink data, the duplicated sidelink data is obtained by duplicating the original sidelink data, and the transmitter device may send the indication information after determining the indication information. It can be seen from the embodiment of the present disclosure that, by sending the indication information, the transmitter device may indicate at least one of the first logical channel for carrying the original sidelink data or the second logical channel for carrying the duplicated sidelink data, so that the receiver device receiving the indication information can recognize the logical channel for carrying the corresponding duplicated sidelink data.

In the following, the method of the embodiment of the present disclosure will be further described in conjunction with specific embodiments.

In an embodiment, the first identifier for identifying the first logical channel may be an identifier in a first identifier set, wherein the identifier in the first identifier set may be used to identify a logical channel for carrying the original sidelink data, and furthermore, the identifier in the first identifier set may be an identifier corresponding to a logical channel for carrying non-duplicated sidelink data.

In an example, it may be assumed that logical channel 1 to logical channel 10 are logical channels carrying non-duplicated sidelink data, and identifiers 1 to 10 may be the identifiers corresponding to the logical channels 1 to 10, respectively. Thus, the above first identifier set may be a set of identifiers 1 to 10, and the above first identifier may be any one of identifiers 1 to 10.

In another embodiment, the second identifier for identifying the second logical channel may be an identifier in a second identifier set, wherein the identifier in the second identifier set may be used to identify a logical channel for carrying duplicated sidelink data, and furthermore, the identifier in the second identifier set may be an identifier corresponding to a reserved logical channel. In this example, the reserved logical channel may be a reserved logical channel specified by the transmitter device or a reserved logical channel specified by a relevant protocol, which is not limited in this example.

In an example, it may be assumed that the logical channels 11 to 20 are reserved logical channels, and the identifiers 11 to 20 may be the corresponding identifiers of the logical channels 11 to 20, respectively. Thus, the above second identifier set may be the set of the identifiers 11 to 20, and the above second identifier may be any one of the identifiers 11 to 20.

In an example, the above indication information may further include therein a sidelink radio bearer (SLRB) identifier, wherein the SLRB identifier may have a matching relationship with the first identifier and the second identifier. The matching relationship may be a matching relationship specified by a relevant protocol, a matching relationship determined by the transmitter device itself, or a matching relationship pre-negotiated by the transmitter device and the corresponding receiver device, which is not limited in this embodiment.

In an example, the above indication information may further include therein a first mapping relationship, wherein the first mapping relationship may include an association relationship between the first identifier and a first frequency domain resource, and an association relationship between the second identifier and a second frequency domain resource, the first frequency domain resource may be used to transmit the original sidelink data, and the second frequency domain resource may be used to transmit the duplicated sidelink data.

In an example, the first frequency domain resource and the second frequency domain resource may include at least one of a carrier or a bandwidth part (BWP). Specifically, when the first frequency domain resource includes a carrier, the second frequency domain resource also includes a carrier; when the first frequency domain resource includes a BWP, the second frequency domain resource also includes a BWP.

In an embodiment, when the first frequency domain resource includes a carrier, the association relationship between the first identifier and the first frequency domain resource in the first mapping relationship may specifically include: an association relationship between the first identifier and a first carrier set, wherein the first carrier set may include at least one carrier; similarly, when the second frequency domain resource includes a carrier, the association relationship between the second identifier and the second frequency domain resource in the first mapping relationship may specifically include: an association relationship between the second identifier and a second carrier set, wherein the second carrier set may include at least one carrier.

In another embodiment, when the first frequency domain resource includes a BWP, the association relationship between the first identifier and the first frequency domain resource in the first mapping relationship may specifically include: an association relationship between the first identifier and a first BWP set, wherein the first BWP set may include at least one BWP; similarly, when the second frequency domain resource includes a BWP, the association relationship between the second identifier and the second frequency domain resource in the first mapping relationship may specifically include: an association relationship between the second identifier and a second BWP set, wherein the second BWP set may include at least one BWP.

In an embodiment, the indication information sent by the transmitter device may be carried by at least one of following messages: a sidelink system message, outband signaling, and inband signaling.

In an example, the indication information sent by the transmitter device may be carried by the sidelink system message. In this case, the indication information may carry the SLRB identifier and the matching relationship between the SLRB identifier and the first and second identifiers.

In another example, the indication information sent by the transmitter device may be carried by the sidelink system message. In this case, the indication information may carry the SLRB identifier and at least one of the first or second identifier matched with the SLRB identifier. In a case that the indication information carries one of the first and second identifiers, the matching relationship between the SLRB identifier and the first and second identifiers may be a fixed matching relationship.

In the above example, the indication information sent by the transmitter device may be carried by the sidelink system message, and after determining the indication information, the transmitter device may sent the indication information through broadcasting.

Figure 2:
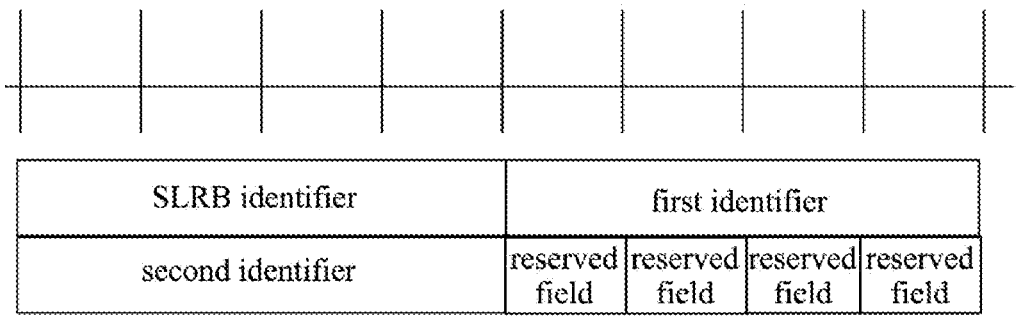
FIG. 2 is a schematic diagram of a format of indication information illustrated in an embodiment of the present disclosure.

In an example, the indication information sent by the transmitter device may be carried by outband signaling. In this case, the indication information may carry the SLRB identifier, and either or both of the first identifier and the second identifier. Of course, the indication information may also carry a certain number of reserved fields. The reserved fields can be arranged in any order. In a specific arrangement, the reserved fields may be filled with bit 0, where the number of the filled bits may satisfy byte alignment. For example, when the indication information is carried by the outband signaling, the format of the indication information may be as shown in FIG. 2.

In this example, the indication information may be carried in the Protocol Data Unit (PDU). Specifically, it may be carried in front of the PDU subheader or between the PDU subheader and the data fields, which is not limited in this example.

In an example, when the indication information is carried by outband signaling, the indication information may be carried in a PDCP PDU, RLC PDU, or Medium Access Control (MAC) PDU, and when the transmitter device sends the indication information, it may send one of the PDCP PDU, RLC PDU and MAC PDU.

In an example, the indication information sent by the transmitter device may be carried by inband signaling. In this case, the indication information may carry the mapping relationship of the combination of the SLRB identifier, the first identifier, and the second identifier. This mapping relationship may be used to indicate whether the combination can be used to transmit the duplicated sidelink data. In the indication information, a certain number of reserved fields may also be carried. The reserved fields can be arranged in any order. In a specific arrangement, the reserved fields may be filled with bit 0, where the number of the filled bits may satisfy byte alignment. For example, when the indication information is carried by the inband signaling, the format of the indication information may be as shown in FIG. 3.

Figure 3:
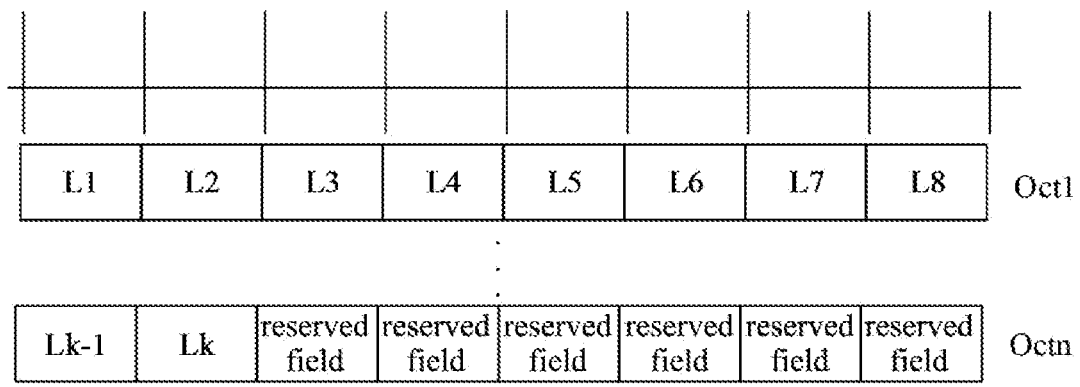
FIG. 3 is another schematic diagram of a format of indication information illustrated in an embodiment of the present disclosure.

In FIG. 3, Oct1 may represent the first byte, Octn may represent the nth byte, where n may be: n=ceil(k/8), k may represent the maximum number of combinations for each pair of first identifier and second identifier corresponding to each configured or pre-configured SLRB. $L_i$ may represent the combination state of the i-th combination of the first identifier and the second identifier. If it takes a value "1", it may indicate that the combination of the first identifier and the second identifier can be used to transmit the replicated data; if it takes a value "0", it may indicate that the combination of the first identifier and the second identifier cannot be used to transmit the replicated data.

Of course, in the example, the value "0" may indicate that the combination of the first identifier and the second identifier can be used to transmit the replicated data, and the value "1" may indicate that the combination of the first identifier and the second identifier cannot be used to transmit the replicated data, which is not limited in the embodiment.

In this example, when the indication information is carried in the inband signaling, it may carried in Control Element (CE). Specifically, it may be carried in front of the CE subheader or between the CE subheader and the data fields, which is not limited in this example.

In an example, when the indication information is carried by inband signaling, the indication information may be carried in a PDCP CE, RLC CE, or MAC CE, and when the transmitter device sends the indication information, it may send one of the PDCP CE, RLC CE, and MAC CE.

In an embodiment, the indication information determined by the transmitter device may further include a third identifier for identifying a duplication data function state of an SLRB corresponding to the SLRB identifier, wherein the duplication data function state may include one of an activated state and a deactivated state.

In an example, the indication information sent by the transmitter device may be carried by the sidelink system message. In this case, the sidelink system message may carry the indication information of one or more SLRB identifiers, and the data duplication function state corresponding thereto.

In another example, the indication information sent by the transmitter device may be carried by the outband signaling. In this case, the indication information may carry a SLRB identifier and the data duplication function state corresponding thereto. For example, when the indication information may be carried by the outband signaling, the format of the indication information may be as shown in FIG. 4.

Figure 4:
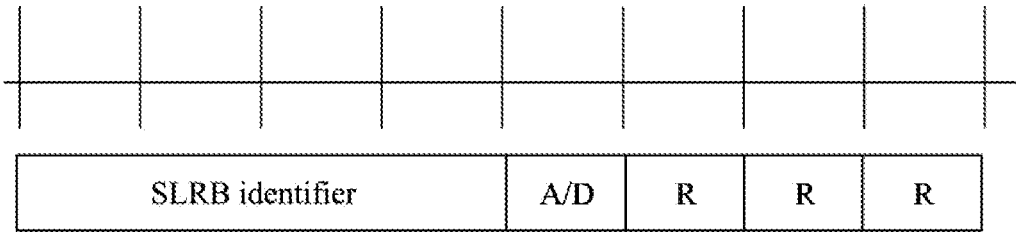
FIG. 4 is further another schematic diagram of a format of indication information illustrated in an embodiment of the present disclosure.

The "A/D: in FIG. 4 may be used to indicate the data duplication function state of the SLRB corresponding to the SLRB identifier. If it takes a value "1", it may indicate that the data duplication function state of the SLRB corresponding to the SLRB identifier is the activated state; if it takes a value "0", it may indicate that the data duplication function state of the SLRB corresponding to the SLRB identifier is the deactivated state.

Of course, in the example, the value "0" may also indicate that the data duplication function state of the SLRB corresponding to the SLRB identifier is the activated state, and the value "1" may also indicate that the data duplication function state of the SLRB corresponding to the SLRB identifier is the deactivated state, which is not limited in the embodiment.

In yet another example, the indication information sent by the transmitter device may be carried by the inband signaling. In this case, the indication information may carry indication data indicating the data duplication function state of the SLRB corresponding to the SLRB identifier. For example, when the indication information is carried by the inband signaling, the format of the indication information may be as shown in FIG. 5.

Figure 5:
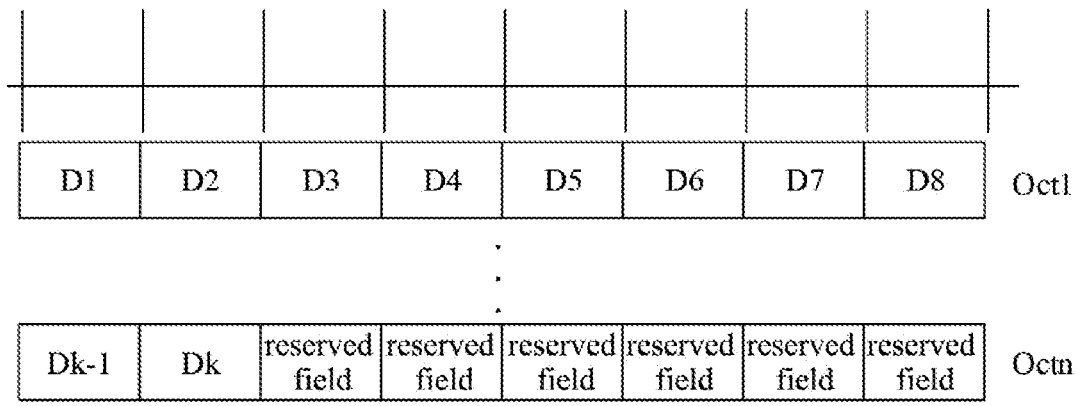
FIG. 5 is still further another schematic diagram of a format of indication information illustrated in an embodiment of the present disclosure.

In FIG. 5, Oct1 may represent the first byte, Octn may represent the nth byte, where n may be: n=ceil(k/8), k may represent the maximum number of SLRBs supporting the data duplication function. $D_i$ may represent the data duplication function state of the SLRB corresponding to the i-th SLRB identifier. If it takes a value "1", it may indicate that the data duplication function state of the SLRB corresponding to the SLRB identifier is the activated state; if it takes a value "0", it may indicate that the data duplication function state of the SLRB corresponding to the SLRB identifier is the activated state.

Of course, in the example, the value "0" may also indicate that the data duplication function state of the SLRB corresponding to the SLRB identifier is the activated state, and the value "1" may also indicate that the data duplication function state of the SLRB corresponding to the SLRB identifier is the deactivated state, which is not limited in the embodiment.

In the embodiment of the present disclosure, the transmitter device may determine indication information, the indication information may include at least one of a first identifier or a second identifier, wherein the first identifier is used to identify a first logical channel, the second identifier is used to identify a second logical channel, the first logical channel may be used to carry original sidelink data, the second logical channel may be used to carry duplicated sidelink data, the duplicated sidelink data is obtained by duplicating the original sidelink data, and after determining the indication information, the transmitter device may send the indication information. It can be seen from the embodiment of the present disclosure that, by sending the indication information, the transmitter device may indicate at least one of the first logical channel for carrying the original sidelink data or the second logical channel for carrying the duplicated sidelink data, so that the receiver device receiving the indication information can recognize the logical channel for carrying the corresponding duplicated sidelink data.

Figure 6:
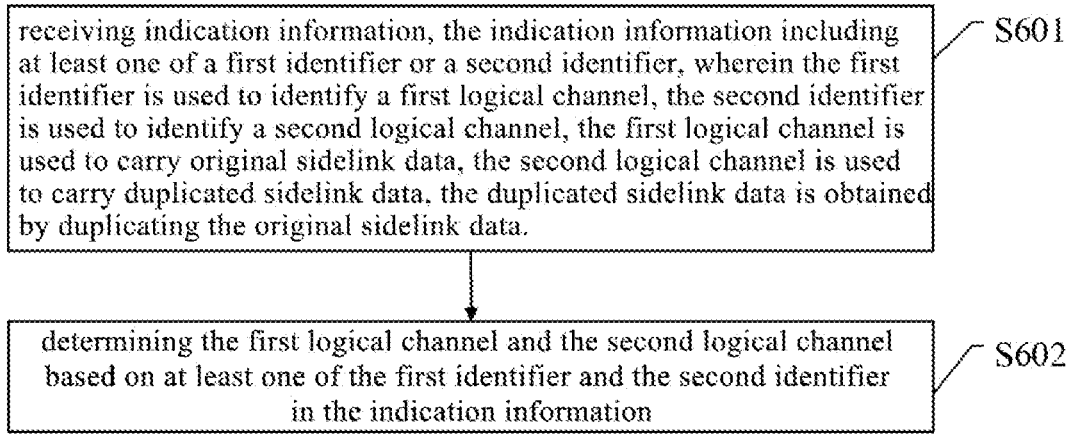
FIG. 6 is a flowchart of a sidelink data indication method in another embodiment of the present disclosure.

FIG. 6 is a flowchart of a sidelink data indication method in another embodiment of the present disclosure. In this embodiment, the sidelink data indication method is applied to a receiver device. The method shown in FIG. 6 may include:

Step 601: receiving indication information, the indication information including at least one of a first identifier or a second identifier, wherein the first identifier is used to identify a first logical channel, the second identifier is used to identify a second logical channel, the first logical channel is used to carry original sidelink data, the second logical channel is used to carry duplicated sidelink data, the duplicated sidelink data is obtained by duplicating the original sidelink data.

Step 602: determining the first logical channel and the second logical channel based on at least one of the first identifier or the second identifier in the indication information.

In the embodiment of the present disclosure, the receiver device may receive the indication information, the indication information may include at least one of a first identifier or a second identifier, wherein the first identifier may be used to identify a first logical channel, the second identifier may be used to identify a second logical channel, the first logical channel may be used to carry original sidelink data, the second logical channel may be used to carry duplicated sidelink data, the duplicated sidelink data is obtained by duplicating the original sidelink data, and after receiving the indication information, the receiver device may determine the first logical channel and the second logical channel based on at least one of the first identifier or the second identifier in the indication information. It can be seen from the embodiment of the present disclosure, by using the received indication information, the receiver device may achieve the determination of the first logical channel for carrying the original sidelink data and the second logical channel for carrying the duplicated sidelink data.

In an embodiment, the first identifier for identifying the first logical channel may be an identifier in a first identifier set, wherein the identifier in the first identifier set may be used to identify a logical channel for carrying the original sidelink data, and furthermore, the identifier in the first identifier set may be an identifier corresponding to a logical channel for carrying non-duplicated sidelink data.

In an embodiment, the second identifier for identifying the second logical channel may be an identifier in a second identifier set, wherein the identifier in the second identifier set may be used to identify a logical channel for carrying duplicated sidelink data, and furthermore, the identifier in the second identifier set may be an identifier corresponding to a reserved logical channel. In this example, the reserved logical channel may be a reserved logical channel specified by the transmitter device or a reserved logical channel specified by a relevant protocol, which is not limited in this example.

In an embodiment, when determining the first logical channel and the second logical channel based on the first identifier and the second identifier, the receiver device may determine the first logical channel and the second logical channel based on a preset identifier pairing relationship and the first or second identifier in the indication information, wherein the preset identifier pairing relationship includes a pairing relationship between the first identifier and the second identifier. In this embodiment, the preset identifier pairing relationship may be an identifier pairing relationship specified by a relevant protocol, an identifier pairing relationship determined by the transmitter device sending the indication information, or an identifier pairing relationship negotiated by the receiver device and the transmitter device sending the indication information, which is not limited in this embodiment.

In an embodiment, the indication information may further include an SLRB identifier, wherein the SLRB identifier has a matching relationship with the first identifier and the second identifier.

In this embodiment, the receiver device may determine the first and second logical channels of the SLRB corresponding to the SLRB identifier according to the matching relationship of the SLRB identifier in the indication information with the first identifier and the second identifier, and at least one of the first or second identifier.

In an embodiment, the receiver device may determine a first frequency domain resource for transmitting the original sidelink data carried by the first logical channel and a second frequency domain resource for transmitting the duplicated sidelink data carried by the second logical channel.

In an example, the indication information may further include a first mapping relationship, wherein the first mapping relationship may include an association relationship between the first identifier and the first frequency domain resource, and an association relationship between the second identifier and the second frequency domain resource, the first frequency domain resource may be used to transmit the original sidelink data, the second frequency domain resource may be used to transmit the duplicated sidelink data.

Thus, in this example, a specific implementation of determining the first frequency domain resource for transmitting the original sidelink data carried by the first logical channel may be: determining the first frequency domain resource for transmitting the original sidelink data carried by the first logical channel based on the association relationship between the first identifier and the first frequency domain resource in the first mapping relationship.

Accordingly, a specific implementation of determining the second frequency domain resource for transmitting the duplicated sidelink data carried by the second logical channel may be: determining the second frequency domain resource for transmitting the duplicated sidelink data carried by the second logical channel based on the association relationship between the second identifier and the second frequency domain resource in the first mapping relationship.

In another example, the indication information may further include a third identifier for identifying a duplication data function state of an SLRB corresponding to the SLRB identifier, wherein the duplication data function state includes one of an activated state and a deactivated state.

When the indication information includes the third identifier, a specific implementation of determining the first frequency domain resource for transmitting the original sidelink data carried by the first logical channel may be: detecting the frequency domain resource when it is determined according to the third identifier that the duplication data function state of the SLRB is the activated state; then, determining the first frequency domain resource for transmitting the original sidelink data carried by the first logical channel based on the detection result.

Accordingly, a specific implementation of determining the second frequency domain resource for transmitting the duplicated sidelink data carried by the second logical channel may be: determining the second frequency domain resource for transmitting the duplicated sidelink data carried by the second logical channel based on a frequency domain resource closest to the first frequency domain resource; or, determining the second frequency domain resource for transmitting the duplicated sidelink data carried by the second logical channel based on the first frequency domain resource and a preset first offset.

In another example, when the indication information includes the third identifier, and it is determined according to the third identifier that the duplication data function state of the SLRB is the activated state, the second frequency domain resource for transmitting the duplicated sidelink data carried by the second logical channel may be determined based on the detection result of the frequency domain resource.

Accordingly, a specific implementation of determining the first frequency domain resource for transmitting the original sidelink data carried by the first logical channel may be:

determining the first frequency domain resource for transmitting the original sidelink data carried by the first logical channel based on a frequency domain resource closest to the second frequency domain resource; or, determining the first frequency domain resource for transmitting the original sidelink data carried by the first logical channel based on the second frequency domain resource and a preset first offset.

In an example, a specific implementation of determining the first frequency domain resource for transmitting the original sidelink data carried by the first logical channel may be: first, obtaining a first frequency domain resource list based on service mapping; then, determining the first frequency domain resource for transmitting the original sidelink data carried by the first logical channel based on frequency domain resources in the first frequency domain resource list.

After the first frequency domain resource is determined, a specific implementation of determining the second frequency domain resource for transmitting the duplicated sidelink data carried by the second logical channel may be:

determining the second frequency domain resource for transmitting the duplicated sidelink data carried by the second logical channel based on a frequency domain resource closest to the first frequency domain resource; or, determining the second frequency domain resource for transmitting the duplicated sidelink data carried by the second logical channel based on the first frequency domain resource and a preset first offset.

In another example, a specific implementation of determining the second frequency domain resource for transmitting the duplicated sidelink data carried by the second logical channel may be:

first, obtaining a second frequency domain resource list based on service mapping; then, determining the second frequency domain resource for transmitting the duplicated sidelink data carried by the second logical channel based on frequency domain resources in the second frequency domain resource list.

After the second frequency domain resource is determined, a specific implementation of determining the first frequency domain resource for transmitting the original sidelink data carried by the first logical channel may be:

determining the first frequency domain resource for transmitting the original sidelink data carried by the first logical channel based on a frequency domain resource closest to the second frequency domain resource; or, determining the first frequency domain resource for transmitting the original sidelink data carried by the first logical channel based on the second frequency domain resource and a preset first offset.

In an embodiment, when it is determined according to the third identifier that the duplication data function state of the SLRB is the activated state, the original sidelink data carried by the first logical channel may be received based on the above determined first frequency domain resource, and the duplicated sidelink data carried by the second logical channel may be received based on the above determined second frequency domain resource.

In an embodiment, when it is determined according to the third identifier that the duplication data function state of the SLRB is the activated state, the receiver device may perform blind detection on the frequency domain resource if the receiver device does not determine the first frequency domain resource for transmitting the original sidelink data carried by the first logical channel and does not determine the second frequency domain resource for transmitting the duplicated sidelink data carried by the second logical channel.

In an embodiment, the first frequency domain resource and the second frequency domain resource may include at least one of a carrier or a bandwidth part (BWP). Specifically, when the first frequency domain resource includes a carrier, the second frequency domain resource also includes a carrier; when the first frequency domain resource includes a BWP, the second frequency domain resource also includes a BWP.

In an embodiment, when the first frequency domain resource includes a carrier, the association relationship between the first identifier and the first frequency domain resource in the first mapping relationship may specifically include: an association relationship between the first identifier and a first carrier set, wherein the first carrier set may include at least one carrier; similarly, when the second frequency domain resource includes a carrier, the association relationship between the second identifier and the second frequency domain resource in the first mapping relationship may specifically include: an association relationship between the second identifier and a second carrier set, wherein the second carrier set may include at least one carrier.

In another embodiment, when the first frequency domain resource includes a BWP, the association relationship between the first identifier and the first frequency domain resource in the first mapping relationship may specifically include: an association relationship between the first identifier and a first BWP set, wherein the first BWP set may include at least one BWP; similarly, when the second frequency domain resource includes a BWP, the association relationship between the second identifier and the second frequency domain resource in the first mapping relationship may specifically include: an association relationship between the second identifier and a second BWP set, wherein the second BWP set may include at least one BWP.

In an embodiment, the indication information received by the receiver device may be carried by at least one of following messages: a sidelink system message, outband signaling, and inband signaling.

In an example, when the indication information is carried by outband signaling, the indication information may be carried in a PDCP PDU, RLC PDU, or (MAC PDU, and when the receiver device receives the indication information, it may receive one of the PDCP PDU, RLC PDU and MAC PDU.

In an example, when the indication information is carried by inband signaling, the indication information may be carried in a PDCP CE, RLC CE, or MAC CE, and when the receiver device receives the indication information, it may receive one of the PDCP CE, RLC CE, and MAC CE.

The detailed contents that the indication information is carried by at least one of the sidelink system message, outband signaling, or in-band inband signaling have been detailed in the embodiment as disclosed above, thus will not be repeated in this embodiment of the present disclosure again.

In an embodiment, the receiver device may send indication information for indicating candidate data before receiving the instruction information, the candidate data may include at least one of a fourth identifier for identifying a first candidate logical channel or a fifth identifier for identifying a second candidate logical channel, wherein the first candidate logical channel is a candidate logical channel for carrying original sidelink data, the second candidate logical channel is a candidate logical channel for carrying duplicated sidelink data; in an example, the first and second candidate logical channels may be logical channels recommended by the receiver device.

In an example, after sending the indication information for indicating the candidate data, the receiver device may perform blind detection on the first and second candidate logical channels.

In another example, when it is determined according to the third identifier that the duplication data function state of the SLRB is the activated state, the receiver device may perform blind detection on the first and second candidate logical channels.

In the embodiment of the present disclosure, the receiver device may receive the indication information, the indication information may include therein at least one of the first identifier or the second identifier, wherein the first identifier may be used to identify the first logical channel, the second identifier may be used to identify the second logical channel, the first logical channel may be used to carry the original sidelink data, the second logical channel may be used to carry the duplicated sidelink data, the duplicated sidelink data is obtained by duplicating the original sidelink data, and after receiving the indication information, the receiver device may determine the first and second logical channels based on at least one of the first or second identifier in the indication information. It can be seen from the embodiment of the present disclosure that, by using the received indication information, the receiver device may achieve the determination of the first logical channel for carrying the original sidelink data and the second logical channel for carrying the duplicated sidelink data.

The sidelink data indication methods according to the embodiments of the present disclosure have been described in detail above with reference to FIGS. 1 to 6, and a terminal equipment according to an embodiment of the present disclosure will be described in detail below with reference to FIG. 7.

Figure 7:
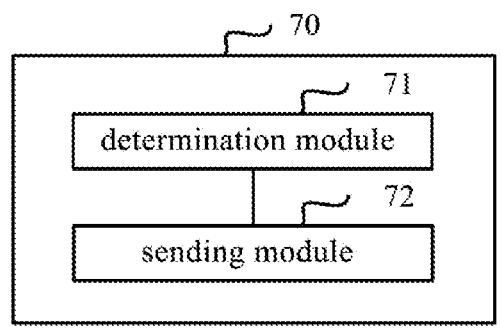
FIG. 7 is a structural diagram of a terminal equipment in an embodiment of the present disclosure.

FIG. 7 is s structural diagram of a terminal equipment according to an embodiment of the present disclosure. As shown in FIG. 7, the terminal equipment 70 includes:

a determination module 71 for determining indication information, the indication information including at least one of a first identifier or a second identifier, wherein the first identifier is used to identify a first logical channel, the second identifier is used to identify a second logical channel, the first logical channel is used to carry original sidelink data, the second logical channel is used to carry duplicated sidelink data, the duplicated sidelink data is obtained by duplicating the original sidelink data; and a sending module 72 for sending the indication information.

The terminal equipment according to the embodiment of the present disclosure may determine the indication information, the indication information may include at least one of a first identifier or a second identifier, wherein the first identifier is used to identify a first logical channel, the second identifier is used to identify a second logical channel, the first logical channel is used to carry original sidelink data, the second logical channel is used to carry duplicated sidelink data, the duplicated sidelink data is obtained by duplicating the original sidelink data; after determining the indication information, the terminal equipment may send the indication information. It can be seen from the embodiment of the present disclosure that the terminal equipment may indicate at least one of the first logical channel for carrying the original sidelink data or the second logical channel for carrying the duplicated sidelink data by sending the indication information, so that a terminal equipment receiving the indication information can recognize the logical channel carrying the corresponding sidelink data.

Optionally, as an embodiment, the first identifier is an identifier in a first identifier set, the identifier in the first identifier set is used to identify a logical channel for carrying the original sidelink data, the identifier in the first identifier set is an identifier corresponding to a logical channel for carrying non-duplicated sidelink data; the second identifier is an identifier in a second identifier set, the identifier in the second identifier set is used to identify a logical channel for carrying duplicated sidelink data, the identifier in the second identifier set is an identifier corresponding to a reserved logical channel.

Optionally, as an embodiment, the indication information further includes therein a sidelink radio bearer (SLRB) identifier, wherein the SLRB identifier has a matching relationship with the first identifier and the second identifier.

Optionally, as an embodiment, the indication information further includes therein a first mapping relationship, wherein the first mapping relationship includes an association relationship between the first identifier and a first frequency domain resource, and an association relationship between the second identifier and a second frequency domain resource, the first frequency domain resource is used to transmit the original sidelink data; the second frequency domain resource is used to transmit the duplicated sidelink data.

Optionally, as an embodiment, the first frequency domain resource includes a carrier, the second frequency domain resource includes a carrier; or, the first frequency domain resource includes a bandwidth part (BWP), the second frequency domain resource includes a BWP.

Optionally, as an embodiment, when the first frequency domain resource includes a carrier, the association relationship between the first identifier and the first frequency domain resource includes: an association relationship between the first identifier and a first carrier set, wherein the first carrier set includes at least one carrier; when the second frequency domain resource includes a carrier, the association relationship between the second identifier and the second frequency domain resource includes: an association relationship between the second identifier and a second carrier set, wherein the second carrier set includes at least one carrier.

Optionally, as an embodiment, when the first frequency domain resource includes a BWP, the association relationship between the first identifier and the first frequency domain resource includes: an association relationship between the first identifier and a first BWP set, wherein the first BWP set includes at least one BWP; when the second frequency domain resource includes a BWP, the association relationship between the second identifier and the second frequency domain resource includes: an association relationship between the second identifier and a second BWP set, wherein the second BWP set includes at least one BWP.

Optionally, as an embodiment, the indication information further includes a third identifier for identifying a duplication data function state of an SLRB corresponding to the SLRB identifier, wherein the duplication data function state includes one of an activated state and a deactivated state.

Optionally, as an embodiment, the indication information is carried by at least one of following messages: a sidelink system message, outband signaling, or inband signaling.

Optionally, as an embodiment, when the indication information is carried by the outband signaling, the sending module 72 is specifically configured to:

send a protocol data unit (PDU), wherein the PDU includes therein the outband signaling, the PDU is one of a PDCP PDU, an RLC PDU, and a MAC PDU.

Optionally, as an embodiment, when the indication information is carried by the inband signaling, the sending module 72 is specifically configured to:

send a control element (CE), wherein the CE includes therein the inband signaling, the CE is one of a PDCP CE, an RLC CE and a MAC CE.

The terminal equipment provided by the embodiment of the present disclosure may also perform the method of FIG. 1, and implement the functions of the terminal equipment in the embodiment shown in FIG. 1. For specific implementation, reference may be made to the embodiment shown in FIG. 1, and the details will not be repeated again.

Figure 8:
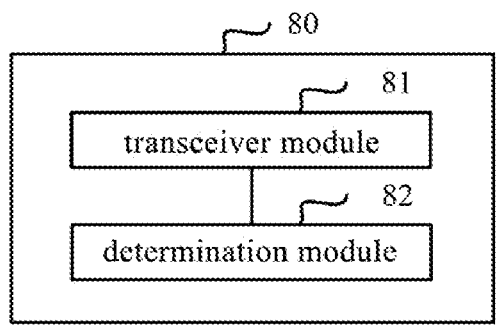
FIG. 8 is a structural diagram of a network equipment in an embodiment of the present disclosure.

FIG. 8 is a structural diagram of a terminal equipment according to another embodiment of the present disclosure. As shown in FIG. 8, the terminal equipment 80 includes:

a transceiver module 81 for receiving indication information, the indication information including at least one of a first identifier or a second identifier, wherein the first identifier is used to identify a first logical channel, the second identifier is used to identify a second logical channel, the first logical channel is used to carry original sidelink data, the second logical channel is used to carry duplicated sidelink data, the duplicated sidelink data is obtained by duplicating the original sidelink data; and a determination module 82 for determining the first logical channel and the second logical channel based on at least one of the first identifier or the second identifier in the indication information.

In the embodiment of the present disclosure, the terminal equipment may receive the indication information, the indication information may include at least one of a first identifier or a second identifier, wherein the first identifier may be used to identify a first logical channel, the second identifier may be used to identify a second logical channel, the first logical channel may be used to carry original sidelink data, the second logical channel may be used to carry duplicated sidelink data, the duplicated sidelink data is obtained by duplicating the original sidelink data; after receiving the indication information, the terminal equipment may determine the first logical channel and the second logical channel based on at least one of the first identifier or the second identifier in the indication information. It can be seen from the embodiment of the present disclosure that the terminal equipment may achieve the determination of the first logical channel for carrying the original sidelink data and the second logical channel for carrying the duplicated sidelink data.

Optionally, as an embodiment, the first identifier is an identifier in a first identifier set, the identifier in the first identifier set is used to identify a logical channel for carrying the original sidelink data, the identifier in the first identifier set is an identifier corresponding to a logical channel for carrying non-duplicated sidelink data; the second identifier is an identifier in a second identifier set, the identifier in the second identifier set is used to identify a logical channel for carrying duplicated sidelink data, the identifier in the second identifier set is an identifier corresponding to a reserved logical channel.

Optionally, as an embodiment, the determination module 82 is specifically configured to:

determine the first logical channel and the second logical channel based on the first identifier, the second identifier, and a preset identifier pairing relationship, wherein the preset identifier pairing relationship includes a pairing relationship between the first identifier and the second identifier.

Optionally, as an embodiment, the indication information further includes a sidelink radio bearer (SLRB) identifier, wherein the SLRB identifier has a matching relationship with the first identifier and the second identifier.

Optionally, as an embodiment, the determination module 82 is further configured to:

determine a first frequency domain resource for transmitting the original sidelink data carried by the first logical channel;

determine a second frequency domain resource for transmitting the duplicated sidelink data carried by the second logical channel.

Optionally, as an embodiment, the indication information further includes therein a first mapping relationship, wherein the first mapping relationship includes an association relationship between the first identifier and a first frequency domain resource, and an association relationship between the second identifier and a second frequency domain resource, the first frequency domain resource is used to transmit the original sidelink data; the second frequency domain resource is used to transmit the duplicated sidelink data;

the determination module 82 is specifically configured to:

determine the first frequency domain resource for transmitting the original sidelink data carried by the first logical channel based on the association relationship between the first identifier and the first frequency domain resource in the first mapping relationship;

determine the second frequency domain resource for transmitting the duplicated sidelink data carried by the second logical channel based on the association relationship between the second identifier and the second frequency domain resource in the first mapping relationship.

Optionally, as an embodiment, the indication information further includes a third identifier for identifying a duplication data function state of an SLRB corresponding to the SLRB identifier, wherein the duplication data function state includes one of an activated state and a deactivated state;

the determination module 82 is specifically configured to:

detecting the frequency domain resource when it is determined according to the third identifier that the duplication data function state of the SLRB is the activated state;

determining the first frequency domain resource for transmitting the original sidelink data carried by the first logical channel based on the detection result;

determining the second frequency domain resource for transmitting the duplicated sidelink data carried by the second logical channel, based on a frequency domain resource closest to the first frequency domain resource; or determining the second frequency domain resource for transmitting the duplicated sidelink data carried by the second logical channel, based on the first frequency domain resource and a preset first offset.

Optionally, as an embodiment, the indication information further includes a third identifier for identifying a duplication data function state of an SLRB corresponding to the SLRB identifier, wherein the duplication data function state includes one of an activated state and a deactivated state;

the determination module 82 is specifically configured to:

detect the frequency domain resource when it is determined according to the third identifier that the duplication data function state of the SLRB is the activated state;

determine the second frequency domain resource for transmitting the duplicated sidelink data carried by the second logical channel based on the detection result;

determine the first frequency domain resource for transmitting the original sidelink data carried by the first logical channel, based on a frequency domain resource closest to the second frequency domain resource; or determine the first frequency domain resource for transmitting the original sidelink data carried by the first logical channel, based on the second frequency domain resource and a preset first offset.

Optionally, as an embodiment, the determination module 82 is specifically configured to:

obtain a first frequency domain resource list based on service mapping;

determine the first frequency domain resource for transmitting the original sidelink data carried by the first logical channel based on frequency domain resources in the first frequency domain resource list;

determine the second frequency domain resource for transmitting the duplicated sidelink data carried by the second logical channel, based on a frequency domain resource closest to the first frequency domain resource; or determine the second frequency domain resource for transmitting the duplicated sidelink data carried by the second logical channel, based on the first frequency domain resource and a preset first offset.

Optionally, as an embodiment, the determination module 82 is specifically configured to:

obtain a second frequency domain resource list based on service mapping;

determine the second frequency domain resource for transmitting the duplicated sidelink data carried by the second logical channel based on frequency domain resources in the second frequency domain resource list;

determine the first frequency domain resource for transmitting the original sidelink data carried by the first logical channel, based on a frequency domain resource closest to the second frequency domain resource; or determine the first frequency domain resource for transmitting the original sidelink data carried by the first logical channel, based on the second frequency domain resource and a preset first offset.

Optionally, as an embodiment, the indication information further includes a third identifier for identifying a duplication data function state of an SLRB corresponding to the SLRB identifier, wherein the duplication data function state includes one of an activated state and a deactivated state;

the transceiver module 81 is further configured to:

when it is determined according to the third identifier that the duplication data function state of the SLRB is the activated state, receive the original sidelink data carried by the first logical channel based on the determined first frequency domain resource, and receive the duplicated sidelink data carried by the second logical channel based on the determined second frequency domain resource.

Optionally, as an embodiment, the first frequency domain resource includes a carrier, the second frequency domain resource includes a carrier; or, the first frequency domain resource includes a bandwidth part (BWP), the second frequency domain resource includes a (BWP).

Optionally, as an embodiment, when the first frequency domain resource includes a carrier, the association relationship between the first identifier and the first frequency domain resource includes: an association relationship between the first identifier and a first carrier set, wherein the first carrier set includes at least one carrier; when the second frequency domain resource includes a carrier, the association relationship between the second identifier and the second frequency domain resource includes: an association relationship between the second identifier and a second carrier set, wherein the second carrier set includes at least one carrier.

Optionally, as an embodiment, when the first frequency domain resource includes a BWP, the association relationship between the first identifier and the first frequency domain resource includes: an association relationship between the first identifier and a first BWP set, wherein the first BWP set includes at least one BWP; when the second frequency domain resource includes a BWP, the association relationship between the second identifier and the second frequency domain resource includes: an association relationship between the second identifier and a second BWP set, wherein the second BWP set includes at least one BWP.

Optionally, as an embodiment, the indication information is carried by at least one of following messages: a sidelink system message, outband signaling, or inband signaling.

Optionally, as an embodiment, when the indication information is carried by the outband signaling, the transceiver module 81 is specifically configured to:

receive a protocol data unit (PDU), wherein the PDU includes therein the outband signaling, the PDU is one of a PDCP PDU, an RLC PDU, and a MAC PDU.

Optionally, as an embodiment, when the indication information is carried by the inband signaling, the transceiver module 81 is specifically configured to:

receive a control element (CE), wherein the CE includes therein the inband signaling, the CE is one of a PDCP CE, an RLC CE and a MAC CE.

Optionally, as an embodiment, the transceiver module 81 is further configured to:

send indication information for indicating candidate data before receiving the instruction information, the candidate data includes at least one of a fourth identifier for identifying a first candidate logical channel or a fifth identifier for identifying a second candidate logical channel, wherein the first candidate logical channel is a candidate logical channel for carrying original sidelink data, the second candidate logical channel is a candidate logical channel for carrying duplicated sidelink data, the duplicated sidelink data is obtained by duplicating the original sidelink data.

The terminal equipment provided by the embodiment of the present disclosure may also perform the method of FIG. 6, and implement the functions of the terminal equipment in the embodiment shown in FIG. 6. For specific implementation, reference may be made to the embodiment shown in FIG. 6, and the details will not be repeated again.

Figure 9:
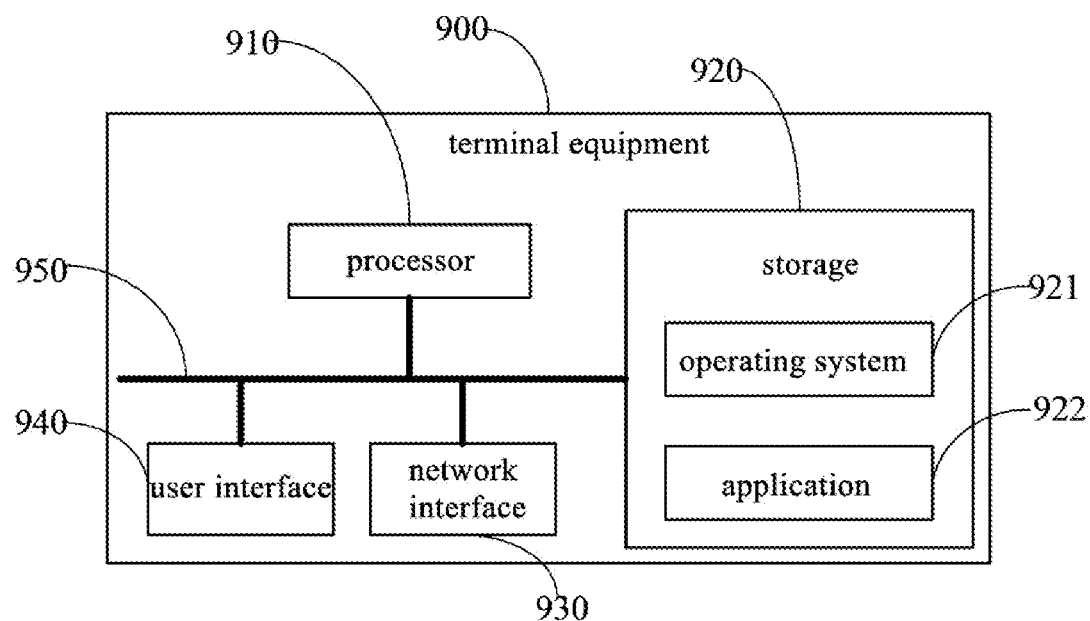
FIG. 9 is a structural diagram of a terminal equipment in still another embodiment of the present disclosure.

FIG. 9 illustrates a structural diagram of a terminal equipment according to still another embodiment of the present disclosure. As shown in FIG. 9, the terminal equipment includes: at least on processor 910, a storage 920, at least one network interface 930 and a user interface 940. The components in the terminal device 900 are coupled together via a bus system 950. It can be understood that the bus system 950 is used to implement connection and communication between these components. In addition to the data bus, the bus system 950 also includes a power bus, a control bus, and a status signal bus. However, for the sake of clarity, various buses are marked as the bus system 950 in FIG. 9.

Among them, the user interface 940 may include a display, a keyboard, or a pointing device (for example, a mouse, a trackball, a touch pad, or a touch screen, etc.).

It can be understood that the storage 920 in the embodiment of the present disclosure may be a volatile memory or a non-volatile memory, or may include both the volatile and non-volatile memories. Among them, the non-volatile memory can be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. By way of example but not limitation, many forms of RAMS are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The storage 920 of the system and method described in the embodiments of the present disclosure is intended to include, but is not limited to, these and any other suitable types of memories.

In some embodiments, the storage 920 stores the following elements, executable modules or data structures, or their subsets, or their extended sets: an operating system 921 and an application 922.

Among them, the operating system 921 includes various system programs, such as a framework layer, a core library layer, and a driver layer, etc., for implementing various basic services and processing hardware-based tasks. The application 922 includes various applications, such as a media player, a browser, etc., for implementing various application services. The programs for implementing the methods of the embodiments of the present disclosure may be included in the application 922.

In the embodiment of the present disclosure, the terminal equipment 900 further includes a computer program stored on the storage 920 and capable of running on the processor 910. When executed by the processor 910, the computer program implements the processes of the above embodiments as shown in FIGS. 1 and 6, and can achieve the same technical effects, which will not be repeated here to avoid repetition.

The methods disclosed in the above embodiments of the present disclosure may be applied to the processor 910, or implemented by the processor 910. The processor 910 may be an integrated circuit chip with signal processing capabilities. In the implementation process, the steps of the above methods may be implemented by an integrated logic circuit of hardware or instructions in the form of software in the processor 910. The above processor 910 may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logical block diagrams disclosed in the embodiments of the present disclosure may be implemented or executed. The general-purpose processor may be a microprocessor or the processor may be any conventional processor or the like. The steps of the methods disclosed in conjunction with the embodiments of the present disclosure may be directly embodied and executed by a hardware decoding processor, or may be executed by a combination of hardware and software modules in the decoding processor. The software module may be located in a computer readable storage medium that is mature in the art, such as a random access memory, a flash memory, a read-only memory, a programmable read-only memory, or an electrically erasable programmable memory, and a register. The computer readable storage medium is located in the storage 920, and the processor 910 reads the information in the storage 920, and performs the steps of the foregoing methods in combination with its hardware. Specifically, the computer readable storage medium has a computer program stored thereon, and when the computer program is executed by the processor 910, the steps of the embodiments shown in FIGS. 1 and 6 are implemented.

It will be appreciated that the embodiments described in the embodiments of the present disclosure may be implemented by hardware, software, firmware, middleware, microcodes, or a combination thereof. For hardware implementation, the processing unit can be implemented in one or more application specific integrated circuits (ASIC), digital signal processors (DSPs), DSP Devices (DSPDs), Programmable Logic Devices (PLDs), Field-Programmable Gate Arrays (FPGAs), general-purpose processors, controllers, microcontrollers, microprocessors, others electronic units for performing the functions described in this disclosure, or a combination thereof.

For software implementation, the techniques described in the embodiments of the present disclosure may be implemented by modules (e.g., procedures, functions, etc.) that perform the functions described in the embodiments of the present disclosure. The software codes may be stored in the storage and executed by the processor. The storage may be implemented in the processor or external to the processor.

Optionally, an embodiment of the present disclosure further provides a terminal equipment including a processor 910, a storage 920, and a computer program stored on the storage 920 and capable of running on the processor 910. When executed by the processor 910, the computer program implements the processes of the above method embodiments as shown in FIGS. 1 and 6, and can achieve the same technical effects, which will not be repeated here to avoid repetition.

An embodiment of the present disclosure further provides a computer readable storage medium having a computer program stored thereon. When executed by a processor, the computer program implements the processes of the above method embodiments as shown in FIGS. 1 and 6, and can achieve the same technical effects, which will not be repeated here to avoid repetition. The computer readable storage medium may be, for example, a read-only memory (ROM), a random access memory (RAM), a magnetic disk or an optical disk, etc.

It should be noted that, herein the terms "comprise", "include" or any other variant thereof are intended to cover non-exclusive inclusion, so that processes, methods, objects or devices that include a series of elements include not only those elements, but also other elements that are not explicitly listed, or include elements inherent to such processes, methods, objects, or devices. Without more restrictions, the element defined by the sentence "comprising a . . . " does not exclude that there are other identical elements in the processes, methods, objects or devices that include the element.

Through the description of the above embodiments, those skilled in the art can clearly understand that the methods in the above embodiments can be implemented by means of software plus a necessary general hardware platform, and of course, can also be implemented by hardware, but in many cases the former is better. Based on such an understanding, the essential technical solution of the present disclosure or the part thereof that contributes to the related art can be embodied in the form of software products, and the computer software product is stored in a storage medium (such as a ROM/RAM, a magnetic disk, an optical disk. etc.), and includes several instructions to enable a terminal (which may be a mobile phone, computer, server, air conditioner, or network device, etc.) to perform the methods described in various embodiments of the present disclosure.

The embodiments of the present disclosure have been described above with reference to the drawings, but the present disclosure is not limited to the above-mentioned specific embodiments. The above specific embodiments are only schematic and not restrictive. Variations can be made by those of ordinary skill in the art under the inspiration of the present disclosure without departing from the purpose of the present disclosure and the scope protected by the claims, and all the variations fall within the protection scope of the present disclosure.

What is claimed is:

1. A sidelink data indication method applied to a transmitter device, comprising:
    determining indication information, the indication information comprising at least one of a first identifier or a second identifier, wherein the first identifier is used to identify a first logical channel, the second identifier is used to identify a second logical channel, the first logical channel is used to carry original sidelink data, the second logical channel is used to carry duplicated sidelink data, the duplicated sidelink data is obtained by duplicating the original sidelink data; and
    sending the indication information;
    wherein the first identifier is an identifier in a first identifier set, the identifier in the first identifier set is used to identify a logical channel for carrying the original sidelink data, the identifier in the first identifier set is an identifier corresponding to a logical channel for carrying non-duplicated sidelink data; the second identifier is an identifier in a second identifier set, the identifier in the second identifier set is used to identify a logical channel for carrying duplicated sidelink data, the identifier in the second identifier set is an identifier corresponding to a reserved logical channel,
    wherein the indication information further comprises a third identifier for identifying a duplication data function state of a sidelink radio bearer (SLRB) corresponding to a SLRB identifier, wherein the duplication state comprises one of an activated state and a deactivated state.

2. The method according to claim 1, wherein the SLRB identifier has a matching relationship with the first identifier and the second identifier.

3. The method according to claim 1, wherein the indication information further comprises therein a first mapping relationship, wherein the first mapping relationship comprises an association relationship between the first identifier and a first frequency domain resource, and an association relationship between the second identifier and a second frequency domain resource, the first frequency domain resource is used to transmit the original sidelink data; the second frequency domain resource is used to transmit the duplicated sidelink data.

4. The method according to claim 3, wherein,
    the first frequency domain resource comprises a carrier, the second frequency domain resource comprises a carrier; or,
    the first frequency domain resource comprises a bandwidth part (BWP), the second frequency domain resource comprises a BWP.

5. The method according to claim 4, wherein,
    when the first frequency domain resource comprises a carrier, the association relationship between the first identifier and the first frequency domain resource comprises: an association relationship between the first identifier and a first carrier set, wherein the first carrier set comprises at least one carrier; when the second frequency domain resource comprises a carrier, the association relationship between the second identifier and the second frequency domain resource comprises: an association relationship between the second identifier and a second carrier set, wherein the second carrier set comprises at least one carrier;
    when the first frequency domain resource comprises a BWP, the association relationship between the first identifier and the first frequency domain resource comprises: an association relationship between the first identifier and a first BWP set, wherein the first BWP set comprises at least one BWP; when the second frequency domain resource comprises a BWP, the association relationship between the second identifier and the second frequency domain resource comprises: an association relationship between the second identifier and a second BWP set, wherein the second BWP set comprises at least one BWP.

6. A terminal equipment, comprising a storage, a processor, and a computer program stored on the storage and capable of running on the processor, the computer program implementing, when executed by the processor, the steps of the method according to claim 1.

7. A sidelink data indication method applied to a receiver device, comprising:
    receiving indication information, the indication information comprising at least one of a first identifier or a second identifier, wherein the first identifier is used to identify a first logical channel, the second identifier is used to identify a second logical channel, the first logical channel is used to carry original sidelink data, the second logical channel is used to carry duplicated sidelink data, the duplicated sidelink data is obtained by duplicating the original sidelink data; and
    determining the first logical channel and the second logical channel based on at least one of the first identifier or the second identifier in the indication information;
    wherein the first identifier is an identifier in a first identifier set, the identifier in the first identifier set is used to identify a logical channel for carrying the original sidelink data, the identifier in the first identifier set is an identifier corresponding to a logical channel for carrying non-duplicated sidelink data; the second identifier is an identifier in a second identifier set, the identifier in the second identifier set is used to identify a logical channel for carrying duplicated sidelink data, the identifier in the second identifier set is an identifier corresponding to a reserved logical channel;
    wherein the indication information further comprises a third identifier for identifying a duplication data function state of a sidelink radio bearer (SLRB) corresponding to a SLRB identifier, wherein the duplication state comprises one of an activated state and a deactivated state.

8. The method according to claim 7, wherein the determining the first logical channel and the second logical channel based on at least one of the first identifier or the second identifier in the indication information comprises:

determining the first logical channel and the second logical channel based on a preset identifier pairing relationship and the first or second identifier in the indication information, wherein the preset identifier pairing relationship comprises a pairing relationship between the first identifier and the second identifier.

9. The method according to claim 7, wherein the SLRB identifier has a matching relationship with the first identifier and the second identifier.

10. The method according to claim 7, wherein the indication information further comprises therein a first mapping relationship, wherein the first mapping relationship comprises an association relationship between the first identifier and a first frequency domain resource, and an association relationship between the second identifier and a second frequency domain resource, the first frequency domain resource is used to transmit the original sidelink data; the second frequency domain resource is used to transmit the duplicated sidelink data;

the method further comprises:
determining the first frequency domain resource for transmitting the original sidelink data carried by the first logical channel based on the association relationship between the first identifier and the first frequency domain resource in the first mapping relationship;
determining the second frequency domain resource for transmitting the duplicated sidelink data carried by the second logical channel based on the association relationship between the second identifier and the second frequency domain resource in the first mapping relationship.

11. The method according to claim 10, wherein the first frequency domain resource comprises a carrier, the second frequency domain resource comprises a carrier; or, the first frequency domain resource comprises a bandwidth part (BWP), the second frequency domain resource comprises a (BWP).

12. The method according to claim 11, wherein,
when the first frequency domain resource comprises a carrier, the association relationship between the first identifier and the first frequency domain resource comprises: an association relationship between the first identifier and a first carrier set, wherein the first carrier set comprises at least one carrier; when the second frequency domain resource comprises a carrier, the association relationship between the second identifier and the second frequency domain resource comprises: an association relationship between the second identifier and a second carrier set, wherein the second carrier set comprises at least one carrier;
when the first frequency domain resource comprises a BWP, the association relationship between the first identifier and the first frequency domain resource comprises: an association relationship between the first identifier and a first BWP set, wherein the first BWP set comprises at least one BWP; when the second frequency domain resource comprises a BWP, the association relationship between the second identifier and the second frequency domain resource comprises: an association relationship between the second identifier and a second BWP set, wherein the second BWP set comprises at least one BWP.

13. The method according to claim 7, further comprising:
detecting the frequency domain resource when it is determined according to the third identifier that the duplication data function state of the SLRB is the activated state;
determining the first frequency domain resource for transmitting the original sidelink data carried by the first logical channel based on a detection result;
determining the second frequency domain resource for transmitting the duplicated sidelink data carried by the second logical channel, based on a frequency domain resource closest to the first frequency domain resource, or the first frequency domain resource and a preset first offset.

14. The method according to claim 13, further comprising:
when it is determined according to the third identifier that the duplication data function state of the SLRB is the activated state, receiving the original sidelink data carried by the first logical channel based on the determined first frequency domain resource, and receiving the duplicated sidelink data carried by the second logical channel based on the determined second frequency domain resource.

15. The method according to claim 7, further comprising:
detecting the frequency domain resource when it is determined according to the third identifier that the duplication data function state of the SLRB is the activated state;
determining the second frequency domain resource for transmitting the duplicated sidelink data carried by the second logical channel based on a detection result;
determining the first frequency domain resource for transmitting the original sidelink data carried by the first logical channel, based on a frequency domain resource closest to the second frequency domain resource, or the second frequency domain resource and a preset first offset.

16. The method according to claim 7, further comprising:
obtaining a first frequency domain resource list based on service mapping;
determining the first frequency domain resource for transmitting the original sidelink data carried by the first logical channel based on frequency domain resources in the first frequency domain resource list;
determining the second frequency domain resource for transmitting the duplicated sidelink data carried by the second logical channel, based on a frequency domain resource closest to the first frequency domain resource, or the first frequency domain resource and a preset first offset.

17. The method according to claim 7, further comprising:
obtaining a second frequency domain resource list based on service mapping;
determining the second frequency domain resource for transmitting the duplicated sidelink data carried by the second logical channel based on frequency domain resources in the second frequency domain resource list;
determining the first frequency domain resource for transmitting the original sidelink data carried by the first logical channel, based on a frequency domain resource closest to the second frequency domain resource, or the second frequency domain resource and a preset first offset.

18. A terminal equipment, comprising a storage, a processor, and a computer program stored on the storage and capable of running on the processor, the computer program implementing, when executed by the processor, the steps of the method according to claim 7.

\* \* \* \* \*